United States Patent
Hewitt et al.

(10) Patent No.: US 11,334,725 B2
(45) Date of Patent: May 17, 2022

(54) SENSOR DATA COLLECTION CONTROL BASED ON NATURAL LANGUAGE INTERACTION

(71) Applicant: International Business Machines Corporation, Armonk, NY (US)

(72) Inventors: Trudy L. Hewitt, Cary, NC (US); Jeremy R. Fox, Georgetown, TX (US); Liam S. Harpur, Skerries (IE); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 376 days.

(21) Appl. No.: 16/734,969

(22) Filed: Jan. 6, 2020

(65) Prior Publication Data
US 2021/0209310 A1    Jul. 8, 2021

(51) Int. Cl.
*G06F 40/35* (2020.01)
*G16Y 20/10* (2020.01)
*H04L 51/046* (2022.01)
*H04L 51/18* (2022.01)

(52) U.S. Cl.
CPC .............. *G06F 40/35* (2020.01); *G16Y 20/10* (2020.01); *H04L 51/046* (2013.01); *H04L 51/18* (2013.01)

(58) Field of Classification Search
CPC ........ G06F 40/35; G16Y 20/10; H04L 51/046
See application file for complete search history.

(56) References Cited

U.S. PATENT DOCUMENTS

| | | | |
|---|---|---|---|
| 5,991,726 A * | 11/1999 | Immarco | G10L 15/22 704/E15.04 |
| 9,225,793 B2 | 12/2015 | Dutta et al. | |
| 9,538,578 B1 * | 1/2017 | Stamatakis | G08C 19/00 |
| 10,122,806 B1 | 11/2018 | Florissi et al. | |
| 10,262,019 B1 | 4/2019 | Reiner et al. | |
| 2002/0107696 A1 * | 8/2002 | Thomas | G10L 15/26 704/E15.044 |
| 2017/0309162 A1 * | 10/2017 | Oberholzer | G08C 17/00 |
| 2018/0157884 A1 * | 6/2018 | Visentin | G06K 19/06037 |
| 2018/0188747 A1 * | 7/2018 | Venturelli | G08G 5/0039 |

(Continued)

FOREIGN PATENT DOCUMENTS

WO    2013123445 A1    8/2013

OTHER PUBLICATIONS

Mendhurwar et al., Emerging synergies between Internet of Things and social technologies, Apr. 12, 2018, https://www.tandfonline.com/doi/full/10.1080/1097198X.2018.1462918.

(Continued)

*Primary Examiner* — Sargon N Nano
(74) *Attorney, Agent, or Firm* — Garg Law Firm, PLLC; Rakesh Garg; Michael O'Keefe (57) ABSTRACT

A discourse pattern is generated by analyzing a set of natural language interactions. A sensor activation plan corresponding to the discourse pattern is determined, the sensor activation plan comprising a data collection parameter corresponding to a first sensor. Within a first natural language interaction, a first pattern having above a threshold similarity to the discourse pattern is detected. Responsive to the detecting, a configuration of the sensor is adjusted according to the sensor activation plan.

20 Claims, 7 Drawing Sheets (56) References Cited

U.S. PATENT DOCUMENTS

2018/0191867 A1    7/2018  Siebel et al.
2018/0232052 A1*   8/2018  Chizeck .................... G06T 7/55
2019/0182329 A1    6/2019  Moss

OTHER PUBLICATIONS

Lynch, How The Internet of Things Can Foster Social Collaboration and Knowledge Sharing in Professional Services Firms, Dec. 19, 2016, https://www.digitalistmag.com/iot/2016/12/19/internet-of-things-foster-social-collaboration-knowledge-sharing-in-professional-services-firms-04773335.
Madaan et al., A Storm in an IoT Cup: The Emergence of Cyber-Physical Social Machines, 2019, https://arxiv.org/ftp/arxiv/papers/1809/1809.05904.pdf.

* cited by examiner

SENSOR DATA COLLECTION CONTROL BASED ON NATURAL LANGUAGE INTERACTION

TECHNICAL FIELD

The present invention relates generally to a method, system, and computer program product for sensor data collection. More particularly, the present invention relates to a method, system, and computer program product for sensor data collection control based on natural language interaction.

BACKGROUND

A natural language is a scripted (written) or a vocalized (spoken) language having a form that is employed by humans for primarily communicating with other humans or with systems having a natural language interface. Users often communicate online using natural language, typically in text form. However, input to an online communication tool can also be converted from another modality, such as speech, into text for processing and transmission to other participants, then responses from others converted back into speech a human can hear.

A message is a unit of conversation. A message is a portion of narrative text, or another form of narrative communication converted into narrative text, communicated from a user to one or more users. A message need not conform to a grammar, but may also be any natural language word or phrase. A message can also include a collaborative action, such as sharing a file or a reference to a website. A discourse, also referred to as an interaction, is a group of messages.

The Internet of Things (IoT) is a system of computing devices. Each device has a unique identifier and the ability to transfer data over a network. IoT devices equipped with one or more sensors are often used in data collection applications. For example, an IoT device equipped to make weather observations, such as using a temperature sensor, moisture sensor, and wind speed measurement sensor, can be programmed to perform measurements and report those measurements at regular intervals.

SUMMARY

The illustrative embodiments provide a method, system, and computer program product. An embodiment includes a method that generates, by analyzing a set of natural language interactions, a discourse pattern. An embodiment determines, corresponding to the discourse pattern, a sensor activation plan, the sensor activation plan comprising a data collection parameter corresponding to a first sensor. An embodiment detects, within a first natural language interaction, a first pattern having above a threshold similarity to the discourse pattern. An embodiment adjusts, responsive to the detecting, a configuration of the sensor according to the sensor activation plan.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that sensor data collection, for example using IoT devices including sensors, often does not match well with users' needs. If data is under-collected, a key event of interest to a user could be missed. Conversely, over-collecting some data can cost resources, such as sensor installations, storage space, data transmission bandwidth, or a cost to purchase the data, that might be more efficiently deployed elsewhere. For example, consider a weather observation device, equipped with a temperature sensor, moisture sensor, and wind speed measurement sensor, programmed to perform measurements and report those measurements at regular intervals. If the device is situated at an airport that is closed at night, observations during night hours may not be needed, but they are performed and reported regardless. Conversely, if weather is changing rapidly, more frequent reports than once per hour may be needed and not be available.

The illustrative embodiments recognize that, in addition to collecting too much or too little data, in some situations data that could be useful or monetized is not collected at all, because users' interest in such data was not identified in time to implement a collection plan. For example, a sensor measuring rainfall amounts might not be useful for aviation users, but data from such a sensor might be useful for farmers near the airport and could be conveniently added to the example airport weather observation device. However, if users are not aware that such data is available, or those providing weather data are not aware of the opportunity to provide rainfall data, the opportunity to collect and perhaps monetize such weather data would likely be missed. Thus, the illustrative embodiments recognize an unmet need to identify opportunities to collect and provide sensor data, using parameters matching users' needs.

The illustrative embodiments recognize that the presently available tools or solutions do not address these needs or provide adequate solutions for these needs. The illustrative embodiments used to describe the invention generally address and solve the above-described problems and other problems related to sensor data collection control based on natural language interaction.

An embodiment can be implemented as a software application. The application implementing an embodiment can be configured as a modification of an existing sensor data collection system, as a separate application that operates in conjunction with an existing sensor data collection system, a standalone application, or some combination thereof.

Particularly, some illustrative embodiments provide a method of using natural language interactions to identify opportunities to collect and provide sensor data, using parameters matching users' needs. Some illustrative embodiments provide a method of generating a discourse pattern by analyzing a set of natural language interactions and determining a sensor activation plan corresponding to the discourse pattern. When a pattern having above a threshold similarity to the discourse pattern is detected, the sensor activation plan is activated.

An embodiment generates a discourse pattern by analyzing a set of natural language interactions. A discourse pattern includes a topic, or subject, of an interaction, as well as optional metadata of the interaction. The optional metadata includes data identifying which users are participating in the interaction, profile information for the participating users (e.g. a role a user plays in an organization, or a user's home or work locations), and timestamp data for one or messages in the interaction. Timestamp data can also be used to determine additional metadata such as a time between when a first message is sent and when a second message responding to the first is sent. In one embodiment, one or more topics, topic categories, and metadata categories are assigned weights, to help distinguish natural language interactions having a higher value from interactions having a lower value. The set of natural language interactions can be stored data, or data being received in real time, or a combination of stored and real-time data.

To determine a topic of an interaction, one embodiment uses a topic modeling analysis. A topic modeling analysis uses a number of occurrences of similar terms in an interaction to determine a topic of that interaction. A term is a word, phrase, sentence, or other subset of a message. For example, the terms "dog" and "bark" are more likely to appear in an interaction about dogs, while the terms "cat" and "meow' are more likely to appear in an interaction about cats, and the terms "the" and "is" are equally likely to appear in interactions about many topics, including dogs and cats. Thus, if an interaction includes a statistically significant number of cat-related terms, and does not include a statistically significant number of dog-related terms, a topic of that interaction is likely to be cats.

To determine a topic of an interaction, another embodiment uses a coarse linguistic analysis, which uses lexicographic relations between terms in an interaction to determine a topic of that interaction.

To determine a topic of an interaction, another embodiment uses term colocations (i.e. terms that co-occur more often than a threshold amount) within an interaction to determine a topic of that interaction. Other methods of determining an interaction topic, including neural network-based models, are also possible and contemplated within the scope of the illustrative embodiments. Another embodiment combines the results of more than one topic-determination analysis to determine a topic of that interaction. In one embodiment, the results of more than one topic-determination analysis are combined using a weighted average, with a weight for each normalized score corresponding to a topic-determination analysis result.

An embodiment determines a correlation between the discourse pattern and a set of sensor data collected by a sensor. An embodiment determines a correlation using any presently-available statistical technique. One embodiment uses a topic and interaction metadata to generate a time series corresponding to a time and frequency at which participants are interacting about a particular topic. For example, one such time series might indicate that participants typically interact about hiking topics during the summer, Another, more granular example time series might indicate that participants typically interact on Friday afternoons to plan meetings to go bicycling on the upcoming weekend. The embodiment determines a correlation between the interaction time series and a time series of sensor data collected by a sensor. For example, the time series indicating that participants typically interact on Friday afternoons to plan meetings to go bicycling on the upcoming weekend might correlate with a peak in weather data accesses—including current conditions and forecasts—for a region that correlates with the interaction participants' residence addresses. This example correlation might be occurring because the bicycling participants only want to plan to meet if the forecasted weather is suitable for their needs, indicating an opportunity to collect sensor data meeting these participants' needs.

One embodiment presents one or more candidate correlations to a human user for the human user's analysis and a final correlation determination. Another embodiment determinates a correlation automatically, without human intervention.

An embodiment uses a correlation between the discourse pattern and a set of sensor data to generate a sensor activation plan corresponding to the discourse pattern. A sensor activation plan includes a sensor from which to collect data and a set of data collection parameters for the sensor. The sensor from which to collect data need not be the same as the sensor generating data used to determine the correlation. The set of data collection parameters includes one or more of a time range for which data is to be collected (e.g., collect data for one second, one minute, or one hour), a time interval between data collections (e.g. collect data once per hour, or twice per day at set times), a minimum and a maximum range for the data to be collected (e.g. only temperatures between −40 and +40 Celsius are to be measured), a desired precision for the data to be collected (e.g. a rainfall amount to the nearest half-centimeter), a format for the data, an address to which the collected data is to be sent (e.g. an Internet Protocol (IP) address or Uniform Resource Locator (URL)), and the like. For example, for a discourse pattern indicating that participants are discussing meeting in the next hour to go bicycling, a corresponding sensor activation plan might include activating a temperature sensor to collect data when the pattern is detected and then at hourly intervals for the next four hours, activating a wind speed and direction sensor to collect data when the pattern is detected and then at ten-minute intervals for the next four hours, and activating a rainfall detection sensor when the pattern is detected and then at twenty-minute intervals for the next four hours. All of the activated sensors are located within a twenty-kilometer radius of the participants' home and work addresses. As a result, sensor data that could be useful to the participants will be collected.

An embodiment analyzes a natural language interaction, in a manner described herein, to detect whether the natural language interaction has above a threshold similarity to a discourse pattern. In one embodiment, the natural language interaction is received and analyzed in real time. For example, if the analysis determines that interaction participants are discussing a cross-country bicycling trip next summer, the interaction might have a similarity below a threshold with a discourse pattern indicating that participants are discussing meeting in the next hour to go bicycling. However, if the analysis determines that interaction participants are discussing going bicycling in the next fifteen minutes, the interaction might have a similarity above a threshold with the same discourse pattern.

If the natural language interaction has above a threshold similarity to a discourse pattern, an embodiment activates a sensor to collect data according to a sensor activation plan corresponding to the discourse pattern. Thus, for example, if an interaction has above a threshold similarity to a discourse pattern indicating that participants are discussing meeting in the next hour to go bicycling, with a corresponding sensor activation plan including activating a temperature sensor to collect data when the pattern is detected and then at hourly intervals for the next four hours, an embodiment activates the temperature sensor to collect data now and at hourly intervals for the next four hours.

An embodiment determines a further correlation between the discourse pattern and a set of sensor data collected by a sensor, and uses the further correlation to adjust the sensor activation plan. The adjusted sensor activation plan includes a sensor from which to collect data, which can be the same as the original sensor of the sensor activation plan or a different sensor. The adjusted sensor activation plan also includes a set of data collection parameters for the sensor, one or more of which can be the same or different from the original set of data collection parameters. The adjustment can comprise collecting more, less, or different sensor data according to a data collection parameter in a manner described herein.

For example, consider a discourse pattern indicating that participants are discussing meeting in the next hour to go bicycling and an original sensor activation plan including activating a wind speed and direction sensor, within a twenty-kilometer radius of the participants' home and work addresses, to collect data when the pattern is detected and then at ten-minute intervals for the next four hours. The embodiment determines a second correlation—that requests for wind data are above a threshold value for only a two-hour period after an interaction matching the discourse pattern occurs. As a result, the sensor activation plan is adjusted to collect data for a two hour period instead of the original four-hour period, reducing data collection and storage needs to match actual usage.

An embodiment continues to iterate the cycle of determining a further correlation between the discourse pattern and a set of sensor data and using the further correlation to adjust the sensor activation plan. Performing further iterations based on which sensor data is actually accessed and which additional data is accessed produces a sensor activation plan that more closely matches users' actual sensor data needs.

The manner of sensor data collection control based on natural language interaction described herein is unavailable in the presently available methods in the technological field of endeavor pertaining to sensor data collection. A method of an embodiment described herein, when implemented to execute on a device or data processing system, comprises substantial advancement of the functionality of that device or data processing system in generating a discourse pattern by analyzing a set of natural language interactions and determining a sensor activation plan corresponding to the discourse pattern. When a pattern having above a threshold similarity to the discourse pattern is detected, the sensor activation plan is activated.

The illustrative embodiments are described with respect to certain types of interactions, discourse patterns, correlations, sensors, data collection parameters, sensor activation plans, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
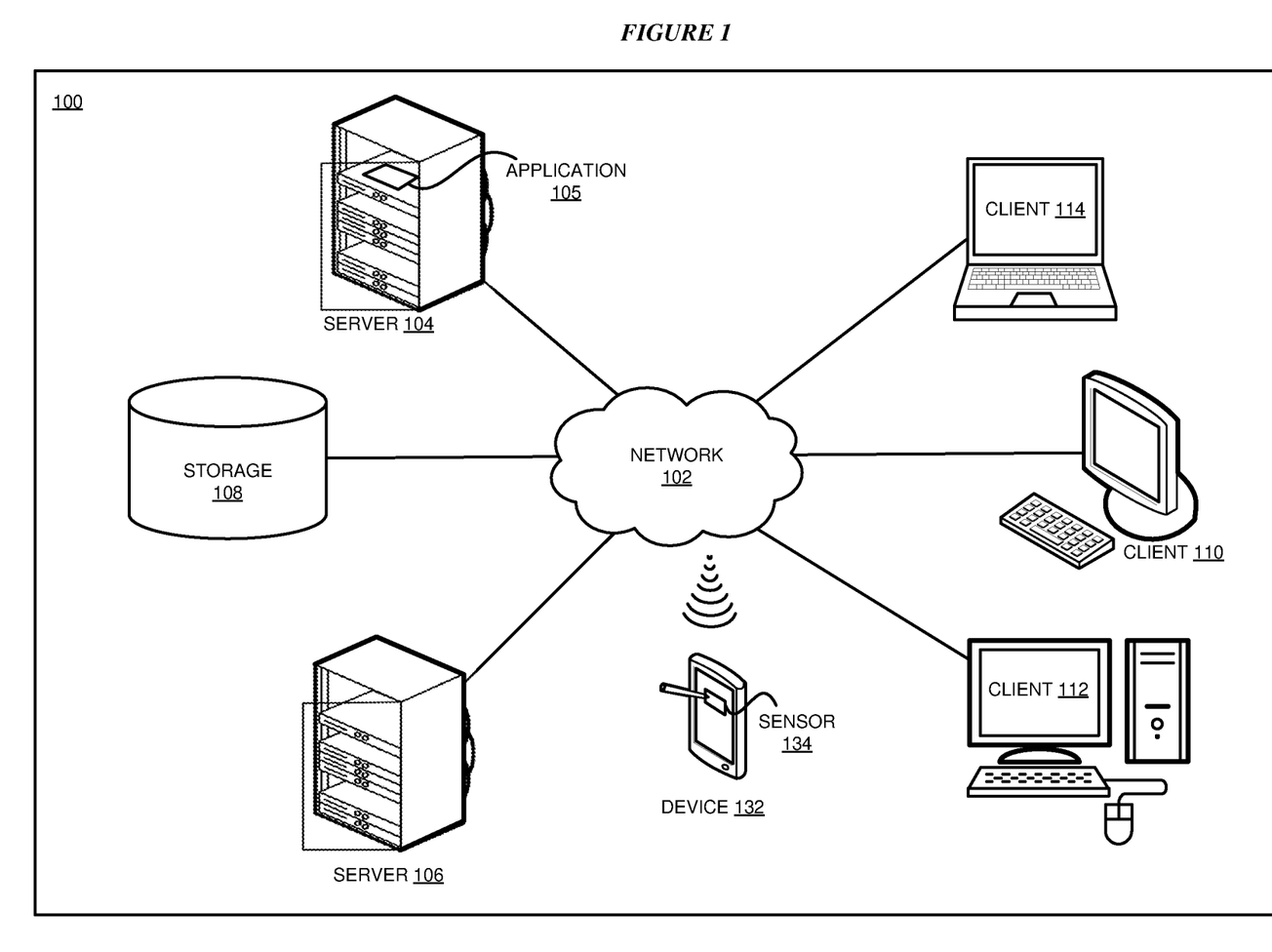
FIG. 1 depicts a block diagram of a network of data processing systems in which illustrative embodiments may be implemented.
Figure 2:
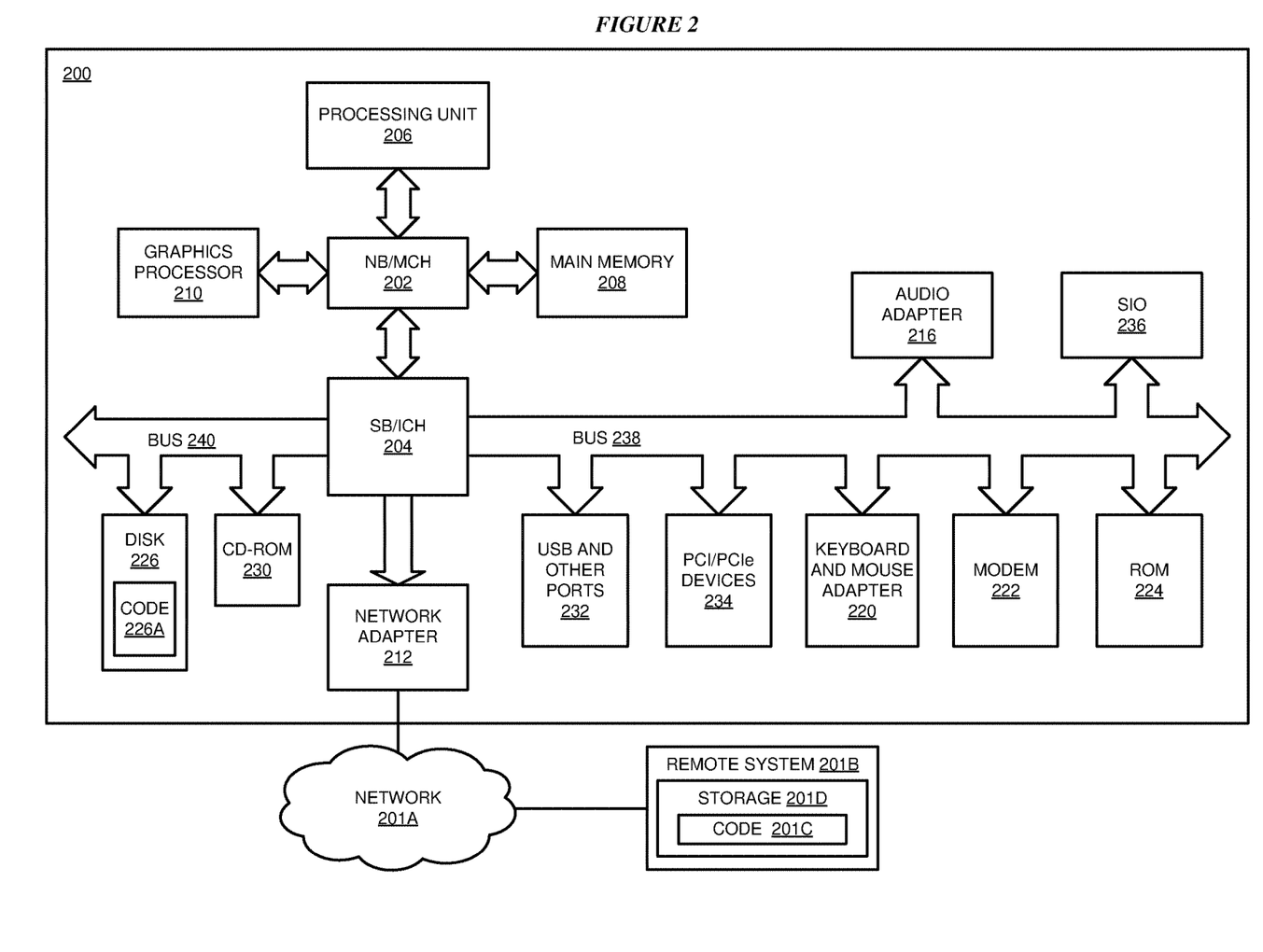
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 132 includes sensor 134. Sensor 134 is usable to perform sensor data collection. In addition, device 132 is able to receive an activation instruction or activation plan for sensor 134, and transmit data collected by sensor 134 to another system or location.

Application 105 implements an embodiment described herein. Application 105 executes in any of servers 104 and 106, clients 110, 112, and 114, and device 132. Application 105 causes activation and data collection from a sensor included in any of clients 110, 112, and 114, and device 132, such as sensor 134, or a sensor included in another system or device (not shown).

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
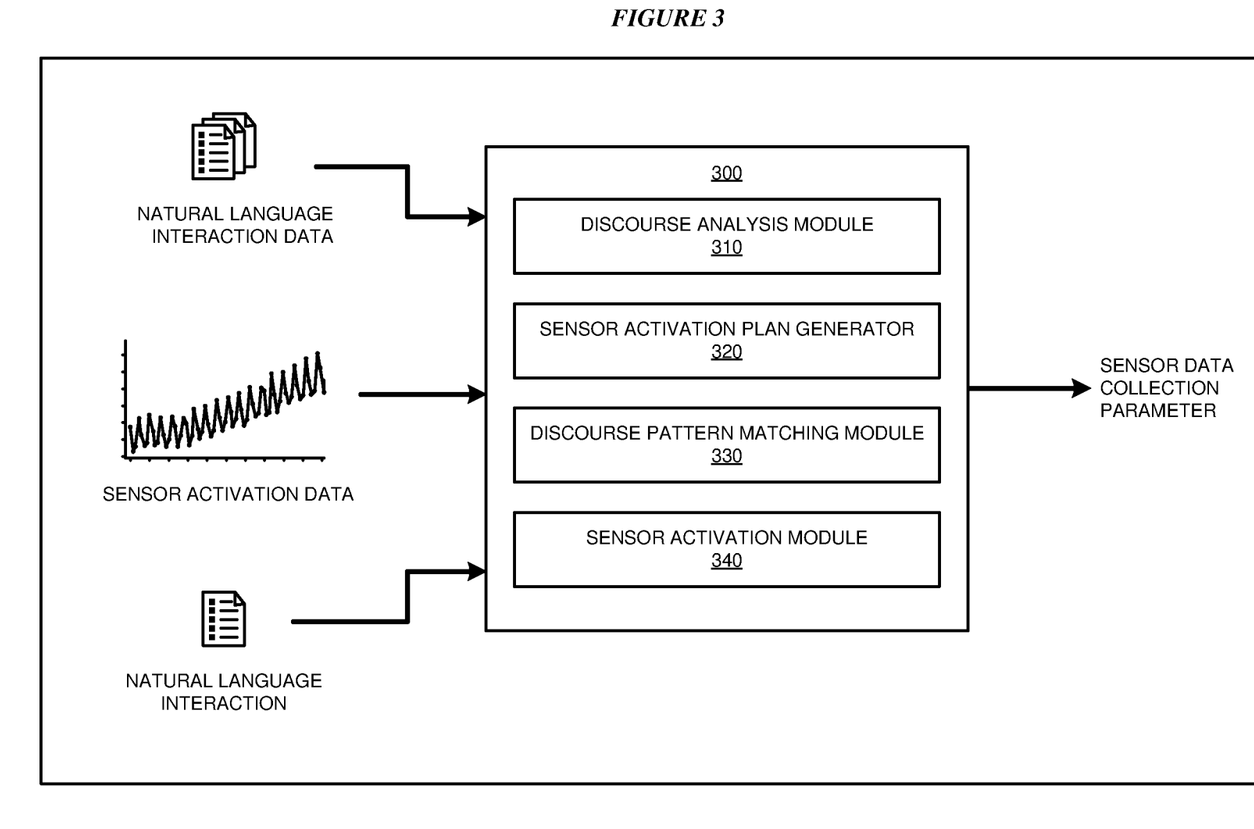
FIG. 3 depicts a block diagram of an example configuration for sensor data collection control based on natural language interaction in accordance with an illustrative embodiment.

With reference to FIG. 3, this figure depicts a block diagram of an example configuration for sensor data collection control based on natural language interaction in accordance with an illustrative embodiment. Application 300 is an example of application 105 in FIG. 1 and executes in any of servers 104 and 106, clients 110, 112, and 114, and device 132 in FIG. 1.

Discourse analysis module 310 generates a discourse pattern by analyzing a set of natural language interactions. A discourse pattern includes a topic, or subject, of an interaction, as well as optional metadata of the interaction. The optional metadata includes data identifying which users are participating in the interaction, profile information for the participating users, and timestamp data for one or messages in the interaction. Timestamp data can also be used to determine additional metadata such as a time between when a first message is sent and when a second message responding to the first is sent. The set of natural language interactions can be stored data, or data being received in real time, or a combination of stored and real-time data. Implementations of module 310 use one or more types of topic-determination analysis to determine a discourse pattern. If more than one type of topic-determination analysis is used, module 310 is configurable to combine the results of topic-determination analyses using a weighted average, with a weight for each normalized score corresponding to a topic-determination analysis result.

Sensor activation plan generator 320 determines a correlation between the discourse pattern and a set of sensor data collected by a sensor, using any presently-available statistical technique. One implementation of application 300 uses a topic and interaction metadata to generate a time series corresponding to a time and frequency at which participants are interacting about a particular topic, and determines a correlation between the interaction time series and a time series of sensor data collected by a sensor. Application 300 is configurable to present one or more candidate correlations to a human user for the human user's analysis and a final correlation determination, or to determinate a correlation automatically, without human intervention.

Sensor activation plan generator 320 uses a correlation between the discourse pattern and a set of sensor data to generate a sensor activation plan corresponding to the discourse pattern. A sensor activation plan includes a sensor from which to collect data and a set of data collection parameters for the sensor. The set of data collection parameters includes one or more of a time range for which data is to be collected, a time interval between data collections, a minimum and a maximum range for the data to be collected, a desired precision for the data to be collected, a format for the data, an address to which the collected data is to be sent, and the like.

Discourse pattern matching module 330 analyzes a natural language interaction, in a manner described herein, to detect whether the natural language interaction has above a threshold similarity to a discourse pattern. Module 330 is configurable to receive and analyze the natural language interaction in real time.

If the natural language interaction has above a threshold similarity to a discourse pattern, sensor activation module 340 activates a sensor to collect data according to a sensor activation plan corresponding to the discourse pattern.

Sensor activation plan generator 320 determines a further correlation between the discourse pattern and a set of sensor data collected by a sensor, and uses the further correlation to adjust the sensor activation plan. The adjusted sensor activation plan includes a sensor from which to collect data, which can be the same as the original sensor of the sensor activation plan or a different sensor. The adjusted sensor activation plan also includes a set of data collection parameters for the sensor, one or more of which can be the same or different from the original set of data collection parameters. The adjustment can comprise collecting more, less, or different sensor data according to a data collection parameter in a manner described herein.

Figure 4:
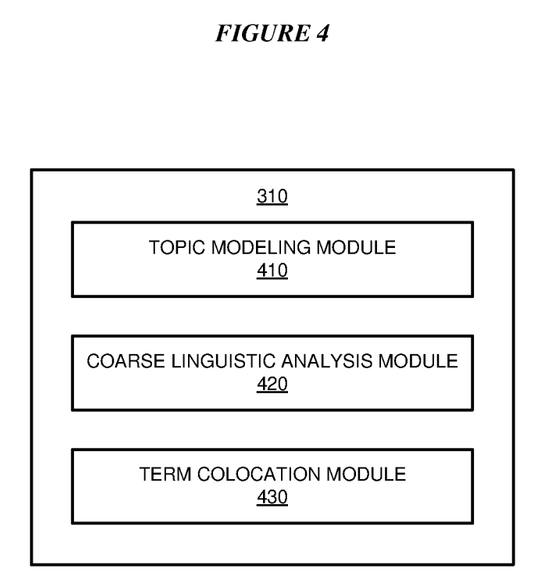
FIG. 4 depicts a block diagram of an example configuration for sensor data collection control based on natural language interaction in accordance with an illustrative embodiment.

With reference to FIG. 4, this figure depicts a block diagram of an example configuration for sensor data collection control based on natural language interaction in accordance with an illustrative embodiment. In particular, FIG. 4 provides more detail of module 310 in FIG. 3.

Topic analysis module 410 uses a topic modeling analysis that uses a number of occurrences of similar terms in an interaction to determine a topic of that interaction. Coarse linguistic analysis module 420 uses a coarse linguistic analysis, using lexicographic relations between terms in an interaction, to determine a topic of that interaction. Term colocation module 430 uses term colocations within an interaction to determine a topic of that interaction.

Figure 5:
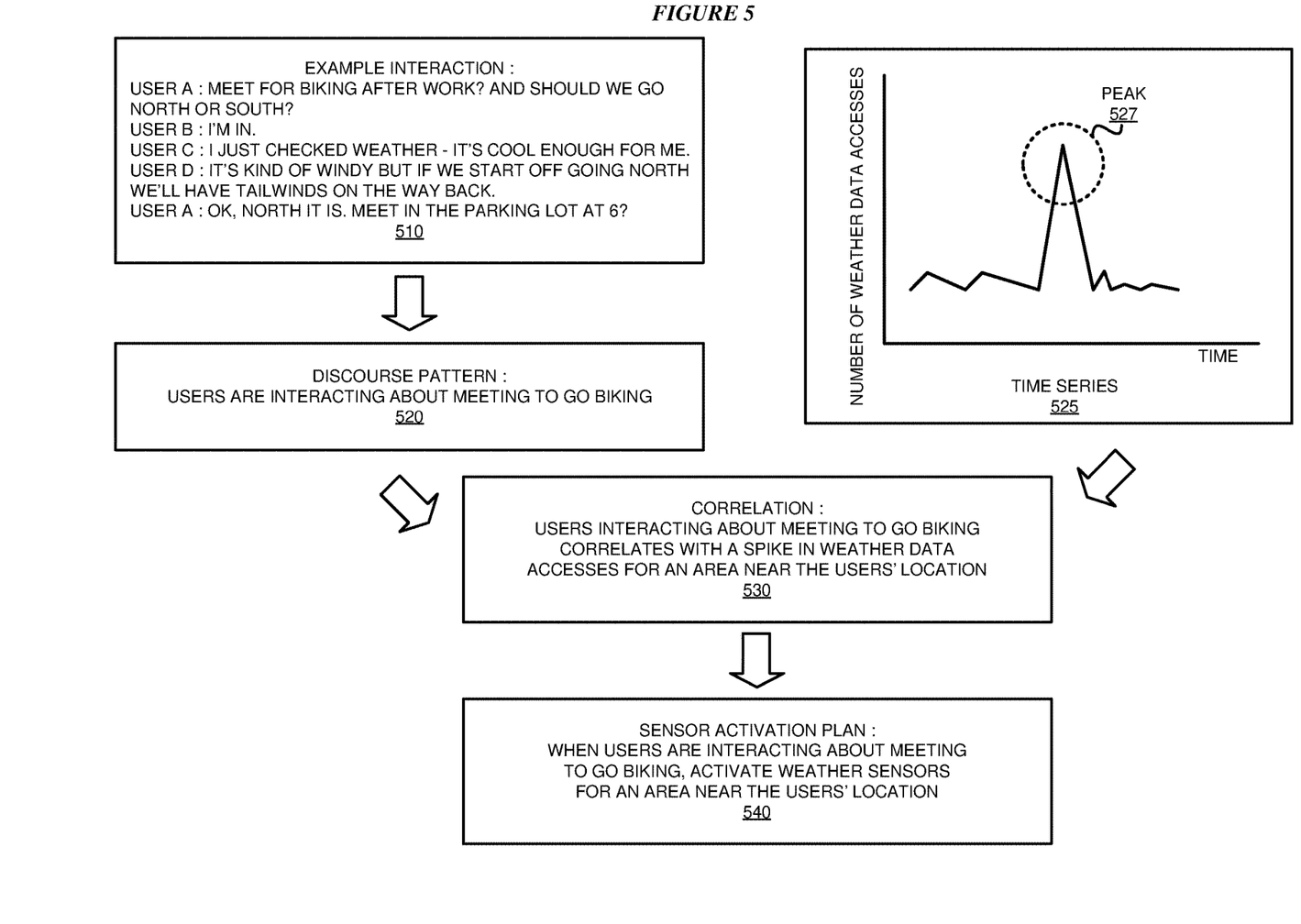
FIG. 5 depicts an example of sensor data collection control based on natural language interaction in accordance with an illustrative embodiment.

With reference to FIG. 5, this figure depicts an example of sensor data collection control based on natural language interaction in accordance with an illustrative embodiment. The example can be executed using application 300 in FIG. 3.

Example interaction 510 is an example of a set of natural language interactions that can be analyzed in a manner described herein to determine a discourse pattern, for example discourse pattern 520. In particular, example interaction 510 comprises four users interacting to plan a meeting to go bicycling, and discourse pattern 520 comprises a pattern of users located in a particular area interacting about meeting to go bicycling.

Application 300 determines correlation 530 between discourse pattern 520 and time series 525, a time series counting a time series of a number of weather data accesses. In particular, peak 527, a spike in weather data accesses for an area, correlates with times at which discourse 520, involving users in the same area, occurs. Thus, application 300 uses correlation 530 to generate sensor activation plan 540: when users are interacting about meeting to go biking, activate weather sensors for an area near the users' location.

Figure 6:
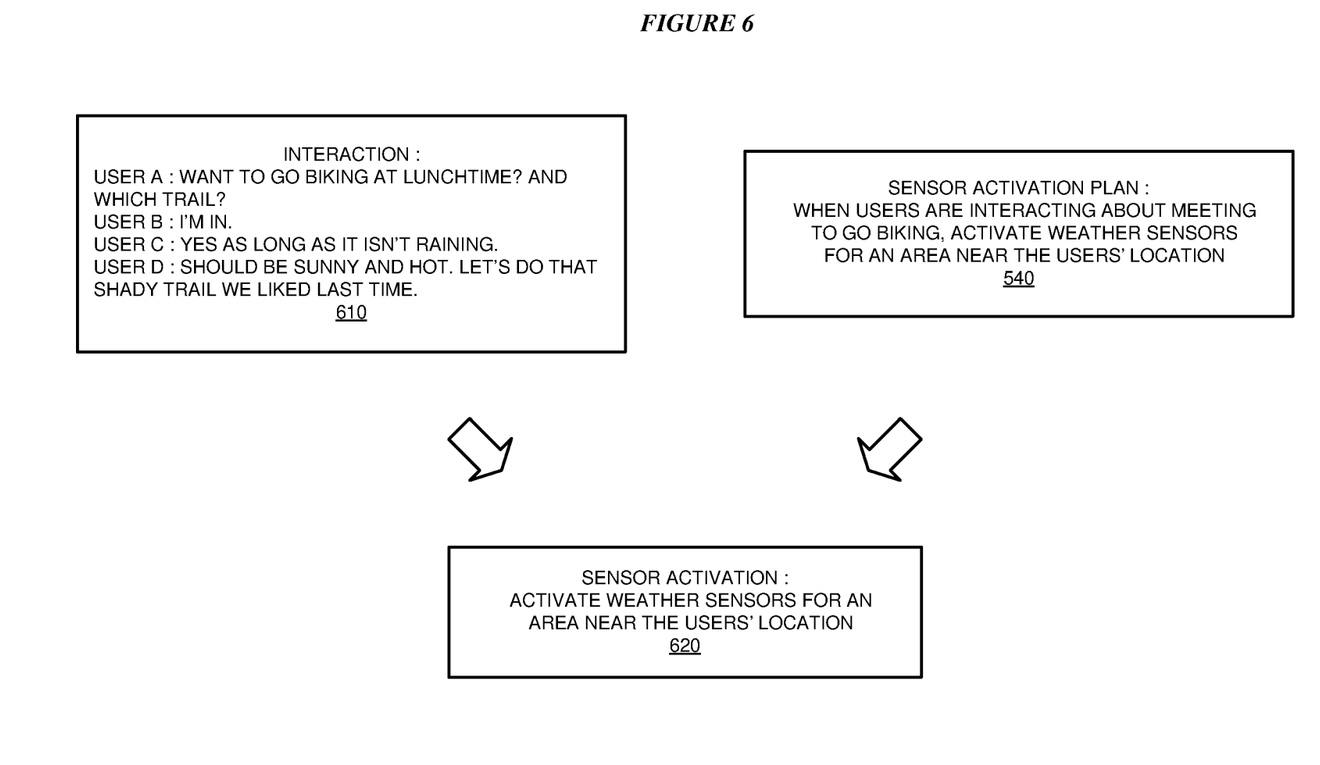
FIG. 6 depicts another example of sensor data collection control based on natural language interaction in accordance with an illustrative embodiment.

With reference to FIG. 6, this figure depicts another example of sensor data collection control based on natural language interaction in accordance with an illustrative embodiment. Sensor activation plan 540 is the same as sensor activation plan 540 in FIG. 5. The example can be executed using application 300 in FIG. 3.

Application 300 analyzes interaction 610, in a manner described herein, to detect whether interaction 510 has above a threshold similarity to a discourse pattern. Here, interaction 610 is concerned with users located in a particular area interacting about meeting to go bicycling, and has above a threshold similarity to discourse pattern 520. Thus, application 300 performs sensor activation 620, activating weather sensors for an area near the users' location, according to sensor activation plan 540 corresponding to discourse pattern 520.

Figure 7:
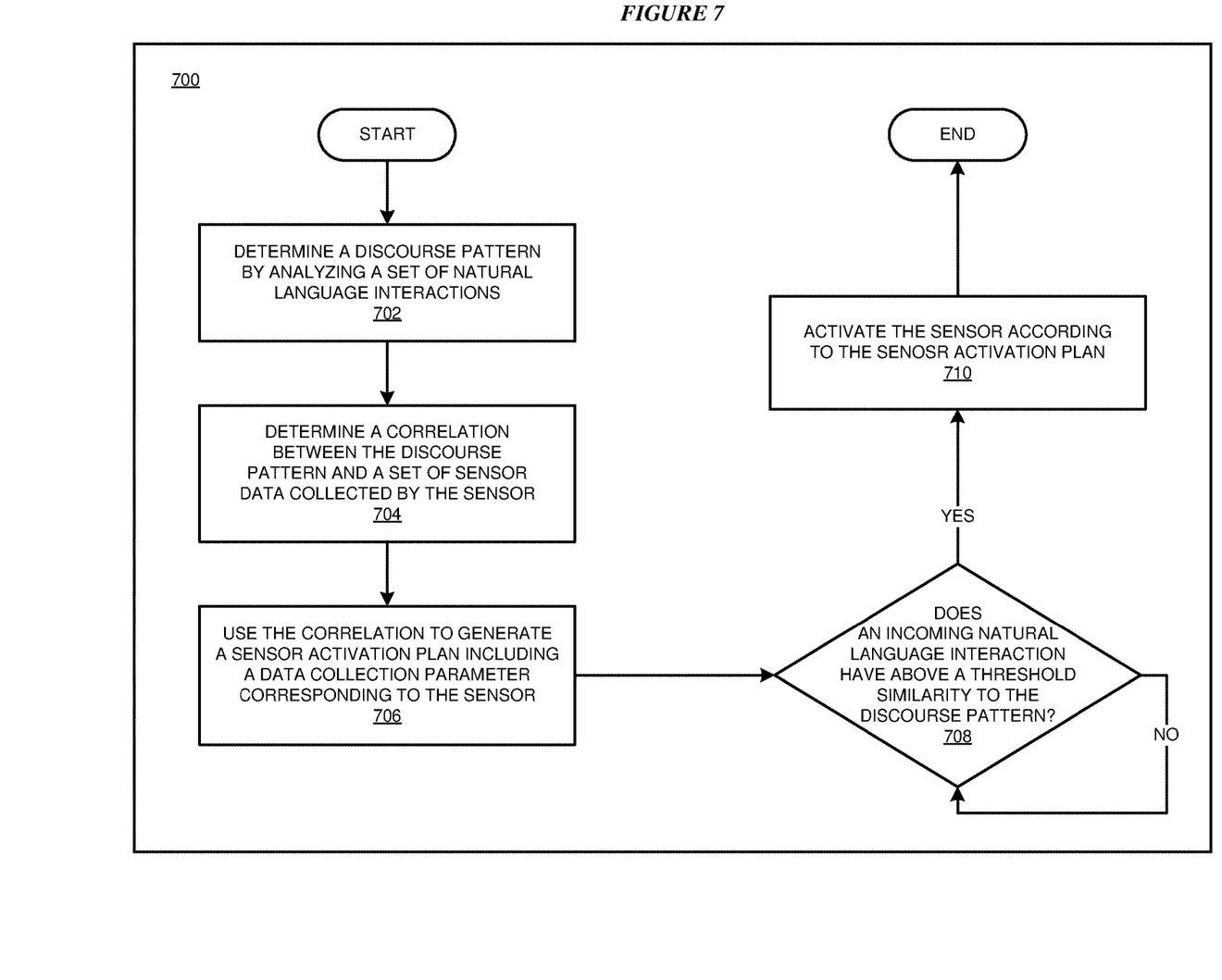
FIG. 7 depicts a flowchart of an example process for sensor data collection control based on natural language interaction in accordance with an illustrative embodiment.

With reference to FIG. 7, this figure depicts a flowchart of an example process for sensor data collection control based on natural language interaction in accordance with an illustrative embodiment. Process 700 can be implemented in application 300 in FIG. 3.

In block 702, the application determines a discourse pattern by analyzing a set of natural language interactions. In block 704, the application determines a correlation between the discourse pattern and a set of sensor data collected by the sensor. In block 706, the application uses the correlation to generate a sensor activation plan including a data collection parameter corresponding to the sensor. In block 708, the application checks whether an incoming natural language interaction has above a threshold similarity to the discourse pattern. If not ("NO" path of block 708), the application remains in block 708 to check another incoming interaction or a further development of the original interaction. Otherwise ("YES" path of block 708), in block 710 the application activates the sensor according to the sensor activation plan. Then the application ends.

Thus, a computer implemented method, system or apparatus, and computer program product are provided in the illustrative embodiments for sensor data collection control based on natural language interaction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
generating, by analyzing a set of natural language interactions, a discourse pattern;
determining, corresponding to the discourse pattern, a sensor activation plan, the sensor activation plan comprising a data collection parameter corresponding to a first sensor;
detecting, within a first natural language interaction, a first pattern having above a threshold similarity to the discourse pattern; and
adjusting, responsive to the detecting, a configuration of the sensor according to the sensor activation plan.

2. The computer-implemented method of claim 1, wherein generating the sensor activation plan comprises:
determining a correlation between the discourse pattern and a set of sensor data, the set of sensor data collected by a second sensor; and
generating, using the correlation, the sensor activation plan.

3. The computer-implemented method of claim 2, wherein the second sensor comprises the first sensor.

4. The computer-implemented method of claim 1, wherein adjusting a configuration of the sensor according to the sensor activation plan comprises activating the sensor according to the sensor activation plan.

5. The computer-implemented method of claim 1, wherein adjusting a configuration of the sensor according to the sensor activation plan comprises configuring the sensor according to the sensor activation plan.

6. The computer-implemented method of claim 1, wherein adjusting a configuration of the sensor according to the sensor activation plan comprises reconfiguring the sensor according to the sensor activation plan.

7. The computer-implemented method of claim 1, further comprising:
determining a second correlation between the discourse pattern and a second set of sensor data collected by the first sensor; and
adjusting, based on the second correlation, the sensor activation plan.

8. The computer-implemented method of claim 7, wherein adjusting the sensor activation plan comprises adjusting a frequency of data collection.

9. The computer-implemented method of claim 7, wherein adjusting the sensor activation plan comprises adjusting a precision of data collection.

10. The computer-implemented method of claim 7, wherein adjusting the sensor activation plan comprises adjusting a duration of data collection.

11. A computer usable program product comprising one or more computer-readable storage devices, and program instructions stored on at least one of the one or more storage devices, the stored program instructions comprising:
program instructions to generate, by analyzing a set of natural language interactions, a discourse pattern;
program instructions to determine, corresponding to the discourse pattern, a sensor activation plan, the sensor activation plan comprising a data collection parameter corresponding to a first sensor;
program instructions to detect, within a first natural language interaction, a first pattern having above a threshold similarity to the discourse pattern; and
program instructions to adjust, responsive to the detecting, a configuration of the sensor according to the sensor activation plan.

12. The computer usable program product of claim 11, wherein program instructions to generate the sensor activation plan comprises:
program instructions to determine a correlation between the discourse pattern and a set of sensor data, the set of sensor data collected by a second sensor; and
program instructions to generate, using the correlation, the sensor activation plan.

13. The computer usable program product of claim 12, wherein the second sensor comprises the first sensor.

14. The computer usable program product of claim 11, wherein program instructions to adjust a configuration of the sensor according to the sensor activation plan comprises program instructions to activate the sensor according to the sensor activation plan.

15. The computer usable program product of claim 11, wherein program instructions to adjust a configuration of the sensor according to the sensor activation plan comprises program instructions to configure the sensor according to the sensor activation plan.

16. The computer usable program product of claim 11, wherein program instructions to adjust a configuration of the sensor according to the sensor activation plan comprises program instructions to reconfigure the sensor according to the sensor activation plan.

17. The computer usable program product of claim 11, further comprising:
program instructions to determine a second correlation between the discourse pattern and a second set of sensor data collected by the first sensor; and
program instructions to adjust, based on the second correlation, the sensor activation plan.

18. The computer usable program product of claim 11, wherein the stored program instructions are stored in the at least one of the one or more storage devices of a local data processing system, and wherein the stored program instructions are transferred over a network from a remote data processing system.

19. The computer usable program product of claim 11, wherein the stored program instructions are stored in the at least one of the one or more storage devices of a server data processing system, and wherein the stored program instructions are downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate, by analyzing a set of natural language interactions, a discourse pattern;
program instructions to determine, corresponding to the discourse pattern, a sensor activation plan, the sensor activation plan comprising a data collection parameter corresponding to a first sensor;

program instructions to detect, within a first natural language interaction, a first pattern having above a threshold similarity to the discourse pattern; and program instructions to adjust, responsive to the detecting, a configuration of the sensor according to the sensor activation plan.

* * * * *